United States Patent
McCrory et al.

(10) Patent No.: US 6,697,962 B1
(45) Date of Patent: Feb. 24, 2004

(54) REMOTE COMPUTER SYSTEM MONITORING AND DIAGNOSTIC BOARD

(75) Inventors: Duane J. McCrory, Malvern, PA (US); Anthony P. Gold, Exton, PA (US); Andrew Sanderson, Havertown, PA (US)

(73) Assignee: Unisys Corporation, Blue Bell, PA (US)

( * ) Notice: Subject to any disclaimer, the term of this patent is extended or adjusted under 35 U.S.C. 154(b) by 559 days.

(21) Appl. No.: 09/692,815

(22) Filed: Oct. 20, 2000

(51) Int. Cl.$^7$ ................................................ G06F 11/00
(52) U.S. Cl. ................................ 714/27; 714/43; 714/4
(58) Field of Search ............................ 714/27, 31, 46, 714/57, 43, 4; 709/223, 224

(56) References Cited

U.S. PATENT DOCUMENTS

| | | | |
|---|---|---|---|
| 3,880,516 A | 4/1975 | Post et al. ..................... | 355/14 |
| 4,468,731 A | 8/1984 | Johnson et al. .............. | 364/200 |
| 4,695,946 A | 9/1987 | Andreasen et al. ......... | 364/200 |
| 4,701,845 A | 10/1987 | Andreasen et al. ......... | 364/200 |
| 4,970,726 A | 11/1990 | Carn et al. .................. | 371/16.5 |
| 5,033,049 A | 7/1991 | Keener et al. ................ | 371/23 |
| 5,088,022 A | 2/1992 | Iwata .......................... | 395/325 |
| 5,119,489 A | 6/1992 | Bond et al. .................. | 395/575 |
| 5,163,052 A | 11/1992 | Evans et al. .................. | 371/18 |
| 5,253,359 A | 10/1993 | Spix et al. .................. | 395/575 |
| 5,307,354 A | 4/1994 | Cramer et al. ............. | 371/11.2 |
| 5,446,741 A | 8/1995 | Boldt et al. ................. | 371/21.1 |
| 5,469,542 A | 11/1995 | Foster et al. ........... | 395/200.01 |
| 5,485,578 A | 1/1996 | Sweazey ................ | 395/200.11 |
| 5,537,626 A | 7/1996 | Kraslavsky et al. ........ | 395/828 |
| 5,613,160 A | 3/1997 | Kraslavsky et al. ........ | 395/836 |
| 5,657,448 A | 8/1997 | Wadsworth et al. ..... | 395/200.5 |

(List continued on next page.)

OTHER PUBLICATIONS

IBM Brochure, "Remote Supervisor Adapter".*
DaveCentral:Uptime Monitor Webpage, "Connectivity—Network Monitors: Uptime Monitor 1.95 Beta," MiraLink Corporation, printed Jan. 25, 1999, 2 pages.

(List continued on next page.)

*Primary Examiner*—Scott Badermann
(74) *Attorney, Agent, or Firm*—Lise A. Rode; Mark T. Starr; Woodcock Washburn LLP

(57) ABSTRACT

A remote monitoring system providing diagnostic and remedial functions to a computer system. The remote monitoring system comprises a service center and a diagnostic agent. The diagnostic agent is located proximate to the monitored computer system and electronically coupled to the monitored computer system such that the diagnostic agent can retrieve information about the various states of the monitored computer system. The diagnostic agent stores the retrieved information and further processes it for future use. Such information includes fault monitor information, accounting information, system performance information, and system management information. In addition, the diagnostic agent has control over the monitored computer system allowing it to perform diagnostic and remedial functions. Further, the diagnostic agent is electronically coupled to a service center located remotely to the monitored computer system. In the context of fault monitoring operations, the diagnostic agent interrogates the monitored computer system for information related to malfunctions. Moreover, the diagnostic agent interacts with the service center through a communication interface to retrieve various diagnostic and remedial information related to discovered computer system operability problems. The diagnostic agent uses the retrieved information to overcome the discovered problems. Alternatively, the remote monitoring system used as an information tool for a business model to provide remedial services for computer systems.

15 Claims, 5 Drawing Sheets

U.S. PATENT DOCUMENTS

| | | | | |
|---|---|---|---|---|
| 5,727,002 | A | | 3/1998 | Miller et al. ................... 371/32 |
| 5,740,346 | A | | 4/1998 | Wicki et al. ........... 395/182.02 |
| 5,793,946 | A | | 8/1998 | Gauthier et al. ....... 395/183.01 |
| 5,796,938 | A | | 8/1998 | Emberty et al. ....... 395/183.03 |
| 5,815,652 | A | * | 9/1998 | Ote et al. ..................... 714/31 |
| 5,815,668 | A | | 9/1998 | Hashimoto ............ 395/200.68 |
| 5,835,700 | A | | 11/1998 | Carbonneau et al. .... 395/183.2 |
| 5,864,659 | A | | 1/1999 | Kini ...................... 395/113.07 |
| 5,890,080 | A | | 3/1999 | Coverdill et al. ............. 701/29 |
| 5,961,594 | A | * | 10/1999 | Bouvier et al. ............. 709/223 |
| 6,006,016 | A | * | 12/1999 | Faigon et al. ................. 714/48 |
| 6,085,244 | A | * | 7/2000 | Wookey ..................... 709/224 |
| 6,338,150 | B1 | * | 1/2002 | Johnson et al. ............... 714/39 |
| 6,438,711 | B2 | * | 8/2002 | Woodruff ..................... 714/27 |
| 6,580,983 | B2 | * | 6/2003 | Laguer-Diaz et al. ......... 701/35 |
| 6,651,190 | B1 | * | 11/2003 | Worley et al. ................ 714/43 |

OTHER PUBLICATIONS

Intel Corporation, "Intel ®LANDesk® Server Manager Products: Because server uptime is the only choice," 1999, 4 pages.

SiteScope Monitors Webpage, "SiteScope Monitors," Freshwater Software, Inc., Copyright © 1997–1998, printed Jan. 25, 1999, 3 pages.

Uptime Monitor Highlights Webpage, Features for Uptime Monitor™, MiraLink Corporation, Copyright © 1997–1998, printed Jan. 25, 1999, 1 page.

Web Alert Service Webpage, "Web Alert—Free WebServer Monitoring Service," Paladin Corporation, Copyright © 1999, printed Jan. 25, 1999, 1 page.

Peter Welter, Web Server Monitoring White Paper Webpage, "Web Server Monitoring White Paper," Summit OnLine Network Management, printed Sep. 22, 1999, 6 pages.

Jeffrey Witt, PC Magazine: Servicing Servers Webpage, "NetTools: From the Bench—Server Management—Servicing Servers," Copyright © 1998, printed Sep. 23, 1999, 2 pages.

* cited by examiner

REMOTE COMPUTER SYSTEM MONITORING AND DIAGNOSTIC BOARD

FIELD OF THE INVENTION

The present invention relates generally to the monitoring of computer systems, and more particularly to the remote diagnostic and remedial monitoring of computer systems using a diagnostic agent.

BACKGROUND OF THE INVENTION

Advances in technology are allowing for new uses of computers in our every-day lives. Computer systems including a computer network generally comprise a server computer that is designed to operate continuously. As such, server computers are ideal to support e-commerce applications that require continuous processing and operation. Computer servers are but a small piece of the abundant technology that is increasingly being employed to facilitate our daily lives. One can imagine a time, not too far in the future, when computer networks will be found in many homes. With the proliferation of computing, and more particularly, computer networks, a need has arisen to maintain and service these computing networks. It is no surprise that computer administrators, today, are constantly seeking new and improved tools and devices to monitor the status of computer systems. This need is especially acute in the commercial sector, where computer system downtime translates directly into lost sales, and more important, frustrated customers. The sooner the administrator realizes the system is down, the sooner the computer system can be repaired and restored back on-line. Currently, there exists automated monitoring and diagnostic systems that can be operated remotely from monitored computer networks that allow the support of multiple systems from a central location. Such computer system monitoring and diagnostic systems allow for quick diagnosis and remedy of downed computer systems.

Computer system monitoring and diagnostic applications, apparatus, and systems are well known. For example, U.S. Pat. No. 5,864,649, entitled "Computer Server with Improved Reliability, Availability, and Serviceability," relates to a computer system having monitor and control functions over a computer system's subsystems. The computer server of a computer system maintains a system management agent which performs monitor and control functions. The system management agent monitors and controls computer systems through system management slots found on the monitored server computer. The system management agent described in the '649 patent, however, does not contemplate alternative communications schemes by which the monitor and control system can monitor and control the computer system. Additionally, the monitor and control functions described in the '649 patent are automated. That is, the '649 patent does not contemplate the possibility of technical service personnel providing remedial services to monitored computer systems. By foreclosing manual solutions to discovered computer system problems, the described monitor and control system is solely relying on automated solutions for computer system operability problems. Hence, the contemplated monitoring and control system would be required to maintain information about solutions for virtually every problem that a computer system may encounter. This implementation is impractical since it requires an inordinate amount of information.

From the foregoing it can be appreciated that there exists a need for a system and methods that allow for the remote monitoring of computer systems providing diagnostic and remedial solutions for computer system problems that is independent of computer system hardware configuration. This would allow the monitoring and control of a computer system through various control interfaces generally found in current computer systems. It would be further advantageous to provide a method for monitoring and control of a computer system that allowed manual technical service to satisfy computer system operability needs, thereby reducing the amount of information needed to be maintained by a computer system monitoring and diagnostic system.

SUMMARY OF THE INVENTION

The present invention provides remote monitoring and diagnostic operations for a computer system independent of operating system, platform configuration, and communication protocol. The present invention relates to a diagnostic agent resident in the monitored computer system that is coupled via a wired or wireless communications network (e.g., wide area network, local area network, telephone network, modem, an intranet, or the Internet) to a service center. The service center includes diagnostic and remedial tools, and a mechanism for directing the diagnostic agent to perform monitoring or remedial functions on the monitored system.

The diagnostic agent performs various monitoring functions, including fault monitoring. Upon failure, the computer system is either automatically or manually rebooted and the diagnostic agent operations are invoked. The types of operations that are performed by the diagnostic agent depend on the nature of the failure or the kind of information that is sought for monitoring. If a computer system failure has occurred, the diagnostic agent performs a check on the malfunctioning computer system to preliminarily determine which portion(s) of the computer system have failed. Based on information gathered from this check, the diagnostic agent communicates with the remote service center to retrieve specific information directed to remedy the discovered failures. The diagnostic agent applies the retrieved information to overcome such failures.

Additionally, service center personnel may use the monitoring information received from the diagnostic agent to suggest, provide, and implement various products and services to meet newly discovered needs of monitored computer systems.

Other aspects of the present invention are described below.

BRIEF DESCRIPTION OF THE DRAWINGS

A presently preferred implementation of the remote monitoring system providing diagnostic and remedial functions in accordance with the present invention is further described with reference to the accompanying drawings in which.

DETAILED DESCRIPTION OF PREFERRED EMBODIMENTS

Overview

Figure 1:
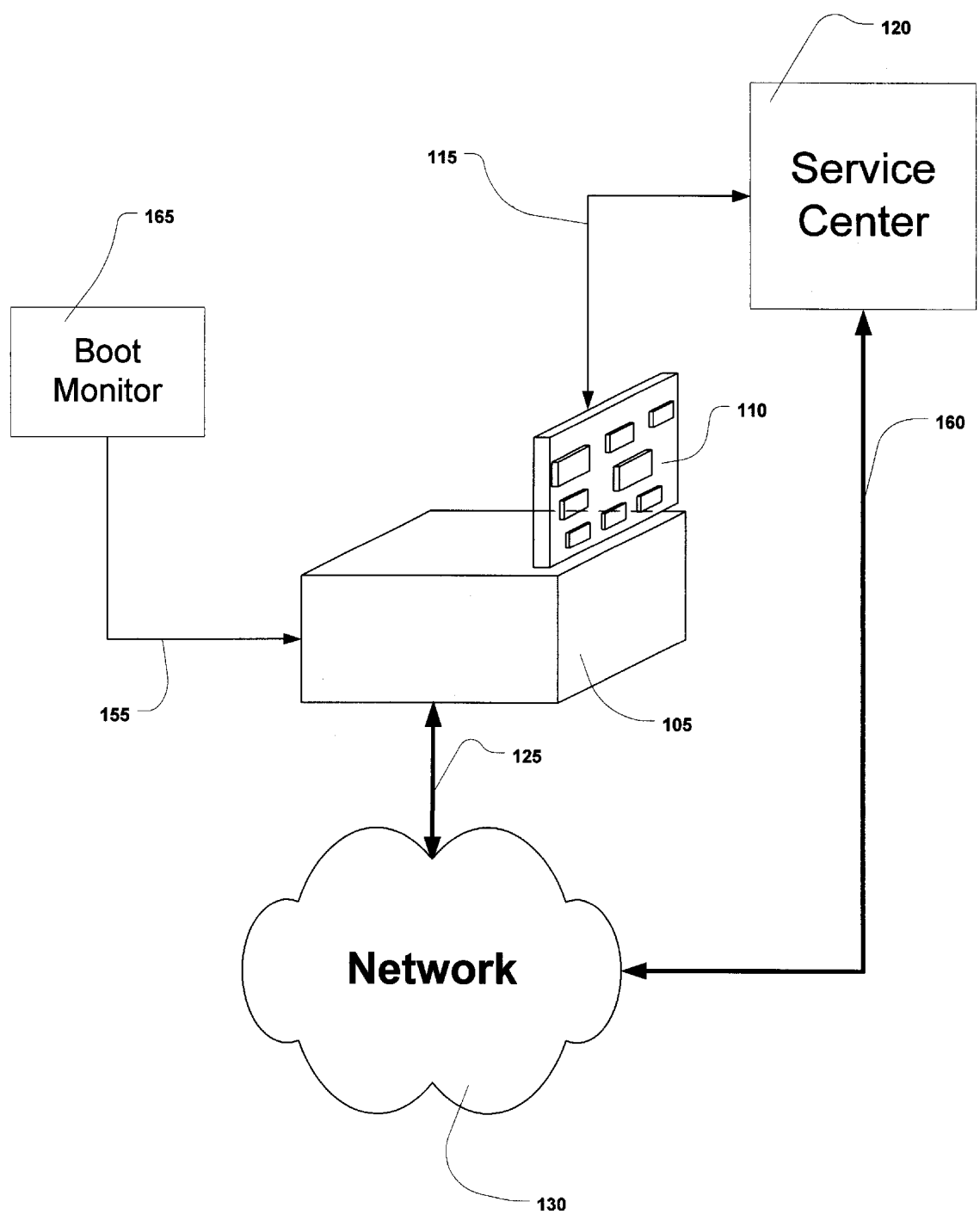
FIG. 1 is a schematic diagram of an exemplary system in accordance with the present invention.

Computer systems, and more particularly computer servers, come in many different shapes and sizes running various operating environments on varying hardware platforms. These computer systems are capable of accepting and running various after-market software applications and hardware devices. Manufacturers of such after-market products are required to produce several variations for a given piece of hardware or software to accommodate the diversity of operability among the varying computer systems. To effectively monitor computer systems, a monitoring system should follow suit by being adaptable to maintain information about various computer systems and components.

For example, it may be desirable to monitor a computer system comprising a World Wide Web server housing an electronic commerce application. The computer server may utilize the "WINDOWS NT"® computer operating system running on "PENTIUM"® III RISC-type computer hardware architecture. Further it may be desirable to update this computer system to contain a US-ROBOTICS® type network interface peripheral card. This newly placed network interface peripheral card would be required to cooperate with the described computer operating system and computer hardware architecture. Correspondingly, a remote monitoring system monitoring the exemplary computer system would be required to have information not only dedicated to the computer operating system and computer hardware architecture, but in addition, would be required to maintain information about the newly placed network interface peripheral card. Alternatively, if the remote monitoring system did not maintain information specific to this network interface peripheral card, the monitoring system, having the ability to be updated, would be able to receive information directed towards the monitoring of the newly introduced network interface peripheral card.

Accordingly, the exemplary computer system can be remotely monitored by a remote monitoring system having a diagnostic agent, a communication interface, and a service center.

In a particular implementation, the diagnostic agent may comprise a computing device such as a peripheral add-on board placed in the boot path the monitored computer system. This add-on board may comprise a storage medium to store electronic information or data gathered from a monitored computer system; a microprocessor to process such information; and a communications area to communicate with other components of the remote monitoring system and more particularly to communicate information and instructions to the monitored computer system. Further, the communications area of the diagnostic agent may cooperate with an external communications interface to facilitate communications with other components of the remote monitoring system, such as a service center. The communications interface may include a fixed wire or wireless modem, or a network connection over a local area network, a wide area network, an intranet, or the Internet. In addition, the communication area of the diagnostic agent may include instruction sets to cooperate with input/output bus slots, system management slots, memory slots, and peripheral slots generally found in computer systems to facilitate communication with the monitored computer system.

Like the diagnostic agent, the service center also maintains diagnostic and remedial capabilities. In a particular implementation, the service center may take the form of a computer server having a communications interface to communicate with the diagnostic agent; a data storage medium such as a disk drive; and at least one microprocessor to process information received from the diagnostic agent. In addition, the service center may maintain a comprehensive library (an electronic database) of diagnostic and remedial information that can be used to satisfy the operability needs of the monitored computer system. To accommodate the diverse operability of computer systems, the stored and updateable diagnostic and remedial information of the service center is directed to diagnose and provide remedies for a variety of computer systems running various operating environments on varying hardware platforms having diverse components.

The remote monitoring system can provide various monitoring, diagnostic, and remedial functions. In a fault monitoring context (i.e. monitoring for computer system malfunctions), the diagnostic agent of the remote monitoring system performs specific operations. When undertaking fault monitoring, the diagnostic agent, that may be resident on the monitored computer system, interrogates the subsystems of the monitored computer system, to ascertain the scope and nature of the malfunctions. Since the diagnostic agent maintains processing and storage capabilities, the diagnostic agent can process the discovered monitored computer system malfunctions and store information relevant to such malfunctions. Armed with this processed information, the diagnostic agent can then communicate this information to a service center. The service center, which is located remotely to the computer system, can work in conjunction with the diagnostic agent to determine an appropriate remedial strategy for discovered malfunctions. The service center provides specific diagnostic and remedial information to the diagnostic agent to combat the problems discovered by the diagnostic agent's interrogation of the monitored computer system. The diagnostic agent can then apply the retrieved information to the troubled computer system to overcome the discovered malfunctions.

By way of example, the remote monitoring system's failure diagnostic and remedial operations are illustrated as follows. For example, if a memory subsystem of the monitored computer system has failed, the monitored computer system becomes a "downed" system. Upon reboot (either manual or automated), the diagnostic agent is activated, and a preliminary determination of failed systems is performed. The reboot of the monitored computer system may be accomplished by a complimentary boot service that is electronically coupled to the monitored computer system through a dedicated boot service/monitored computer system communication interface.

The diagnostic agent then communicates with the monitored computer system through its communication area and determines that the memory subsystem has failed. The diagnostic agent then proceeds to communicate with the remote service center through a diagnostic agent/service center communication interface to retrieve specific diagnostic information or tools to remedy the failed memory system. Such information may include memory driver files, a memory management application, or a memory performance meter. Once retrieved, the downloaded information is processed and then applied by the diagnostic agent to reactivate the failed memory system.

If successful, the memory system problem would be rectified and the monitored computer system would become fully functional once again. Alternative remedial functions that may be employed include direct operator control over the monitored computer system or operator initiated reboot. These functions may be realized through operator input, inputted at the service center. The service center then communicates this input to the diagnostic agent. The diagnostic agent in turn will communicate the information to the monitored computer system to perform the operator input.

If the employed remedial function is unsuccessful, the remote monitoring system would communicate to technical service personnel that the monitored computer system is still non-operational. Technical service personnel would then take over, possibly providing manual remedial operations to the troubled computer system.

When a computer system completely fails, the diagnostic agent may be somewhat foreclosed from performing remedial functions to revive the "downed" computer system. However, the diagnostic agent can still be used as part of a "system diagnosis" to determine why a complete computer failure has occurred. For example, the diagnostic agent may have control to, or access over one of a monitored computer system's operating disks or other data storage device. In such event, the diagnostic agent can access one of the computer system operating disks to retrieve various computer subsystem states. The diagnostic agent can then process such information to create a snapshot of these processed states (i.e. as would be present in a "crash dump" of a failed computer system) present just prior to a computer system's failure. The diagnostic agent can then communicate the snapshot to the service center. Such information would be helpful in determining those sub-system(s) that may have contributed to the complete failure of the computer system.

In addition to the described operations, the diagnostic agent may also collect and communicate other monitoring information to the service center, such as accounting or performance data. Service center personnel may use such data in determining unsatisfied system needs and suggest appropriate products and services directed towards satisfying such needs.

Likewise, the service center is capable of additional operations. For example, the service center may provide an interface to communicate to human operators the status of diagnostic and remedial operations being performed on the monitored computer system. Such interface may include but is not limited to an electronic display terminal, electronic paging, electronic-mail, or facsimile. Additionally, the service center my use a scheduling application to determine the best form of communication and with whom to communicate. (e.g., If the failure occurs during work hours, notify the operator through e-mail. Alternatively, if the failure occurs during non-work hours, notify a different operator through electronic paging). Furthermore, the service center may provide an interface to control monitored computer system functions, via the resident diagnostic agent, in an effort to manually revive "downed" computer systems. Lastly, the service center may be coupled to a data storage device, where it would store information about the monitored computer systems' status and history. With this information, "downed" computer systems could be quickly serviced. Service center personnel reviewing such information may spring to action in serving clients (i.e., the ones who ask for their servers to be monitored) by providing pre-diagnosed replacement parts for "downed" computer systems. Hence, the service center would act as an information tool for the implementation of business method directed to the remote monitoring of computer systems.

Further, the monitored computer system may be a component of a larger computer system. For example, the monitored computer system may comprise a computer server that is part of a larger computer network such as a local area network, a wide area network, an intranet or the Internet. In the event that the primary communications interface between the service center and the diagnostic agent is severed, the service center may use the larger computer network as a secondary communications interface to perform diagnostic and remedial operations on the monitored computer system. This redundant communication interface can be established between the service center and the encompassing computer network in the form of a fixed wire or wireless modem, another local area network, a wide area network, an intranet or the Internet.

As will be described below with respect to FIGS. 1–5, the present invention is directed to a system and methods for remote monitoring of a computer system providing diagnostic and remedial solutions to a monitored computer system. In accordance with a preferred embodiment thereof, the present invention comprises a system and method to couple a service center and service center personnel to a plurality of computer systems allowing remote monitoring of computer systems.

In one embodiment, described more fully hereinafter, the methods and apparatus of the present invention may be implemented as part of a computer system having at least one computer server, a service center, and diagnostic agent. Although the depicted embodiment provides fault monitoring for a computer system having one computer server, those skilled in the art will appreciate that the inventive concepts described herein extend to various types of monitoring, including performance monitoring, accounting monitoring, and system management monitoring for various types of computer systems having a plurality of computing devices running different computing operating systems and having varying hardware configurations.

Monitoring System Description

FIG. 1 shows a computer system having computer server 105. Computer server 105 maintains diagnostic agent 110, which is electronically coupled to service center 120 through communications interface 115 and to computer network 130 through communication interface 125. (Communications interface 115, 125 and 155 may include a fixed wire or wireless modem, local area network, wide area network, an intranet, or the Internet.) Further, service center 120 is electronically coupled to computer network 130 through communication interface 160. Computer network 130 may include but is not limited to a local area network (LAN), a wide area network (WAN), an intranet or the Internet. During operation, diagnostic agent 110 may be placed in the boot path of computer server 105. If computer server 105 fails, boot monitor 165, which is electronically coupled to computer server 105 through communication interface 155, will initiate a reboot of computer server 105. Diagnostic agent 110 will recognize the reboot of computer server 105, communicate with computer server 105 and interrogate computer server 105 to ascertain which computer server subsystems are malfunctioning or have become non-operational. Diagnostic agent 110 will then communicate with service center 120 through communication interface 115 to retrieve specific diagnostic and remedial information to correct the problems determined for computer server 105. In the event that communications interface 120 malfunctions or becomes non-operational, diagnostic agent 110 can communicate with service center 120 through computer network 130 using communication interfaces 125 and 160, respectively.

Monitoring System Processing

Figure 2:
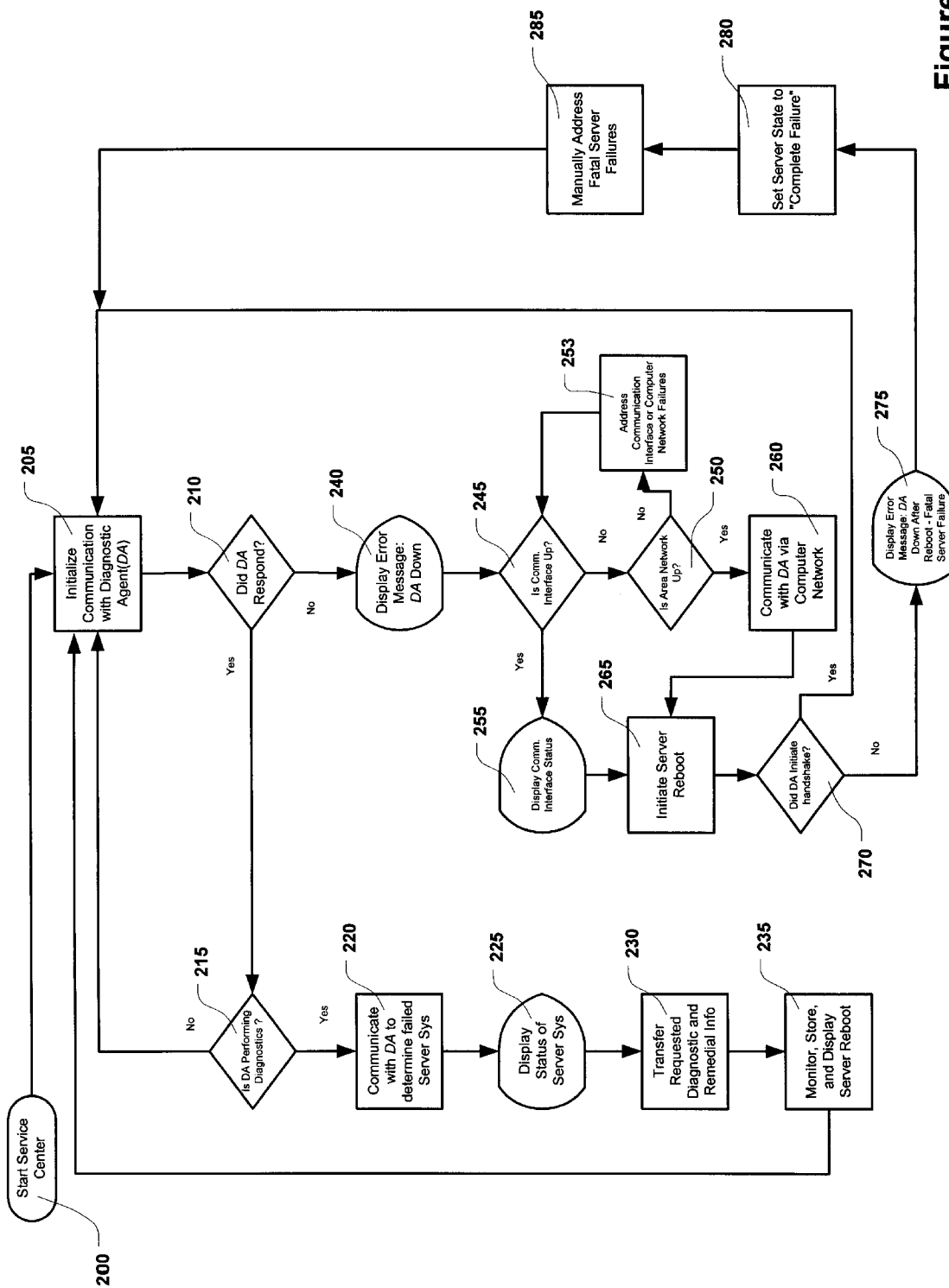
FIG. 2 is a flowchart of the processing that occurs by the service center in accordance with the present invention.

FIG. 2, with reference to FIG. 1, shows the processing performed by the service center 120. Service center 120 starts at block 200. Once started, the service center 120 initiates communication with the diagnostic agent (DA) 110 at block 205. The service center 120 will then wait for a handshake from the remotely located diagnostic agent 110 at block 210. If diagnostic agent 110 responds, service center 120 will then proceed to block 215 to determine if diagnostic agent 110 is performing diagnostic or remedial functions on computer server 105. If the diagnostic agent 110 is in diagnostic or remedial mode, service center 120 will communicate with diagnostic agent 110 at block 220 to receive information relating to possible problems occurring in the subsystems of computer server 105. However, if diagnostic agent 110 is not in diagnostic or remedial mode, the service center will return to block 205, and processing proceeds therefrom. Once the information about the failed computer subsystems is passed to the service center 120 at block 220, the service center 120 then displays the status of the subsystems of computer server 105 at block 225. The service center 120 communicates such information through various means including but not limited to a display monitor, electronic-mail, wireless paging, and facsimile.

While in diagnostic or remedial mode, diagnostic agent 110 performs several operations on computer server 105. Accordingly, the service center 120 interacts with diagnostic agent 110 to facilitate such diagnostic and remedial operations. As part of the diagnostic agent 110 operations, diagnostic agent 110 requires specific information to be transferred from service center 120. Service center 120 passes the information requested by the diagnostic agent at block 230. Additionally, diagnostic agent 110 operation includes the reboot of computer server 105. During a reboot, the service center 120 will monitor, store parameters for, and display information about computer server 105 reboot at block 235. Such information may be used in further processing by diagnostic agent 110 or service center 120. Once a reboot has been completed, service center 120 processing returns to block 205 to initialize communication with diagnostic agent 110 and processing continues therefrom.

However, if diagnostic agent 110 does not respond at block 210, the service center 120 will display an error message at block 240 to indicate that there is a problem with the diagnostic agent 110. A check is then made by the service center at block 245 to determine if the primary communications interface 115 is operational between the service center 120 and the diagnostic agent 110. If communications link 115 is operational at block 245, service center 120 displays the operational status of communication link 115 at block 255. Accordingly, in the effort to establish communications with diagnostic agent 110 and having determined that primary communications interface 115 is operational, service center 120 will then initiate a reboot of computer server 105 at block 265. The service center 120 then waits for a handshake from diagnostic agent 110 at block 270. If the initiated reboot of block 265 was successful in reviving diagnostic agent 110, the service center 120 returns to block 205 to initialize communications with diagnostic agent 110 and processing continues therefrom. However, if the contrary is true, service center 120 will display an error message at block 275 to indicate that there is a fatal failure of computer server 105. The service center will then set the computer server state value to "Critical—Complete Failure." Service center 120 will then wait until computer server 105 failures are addressed independently of the remote monitoring system. Once the critical failures are addressed, service center 120 returns to block 205 to initialize communication with diagnostic agent and processing continues therefrom.

In the alternative, if the communications interface 115 is not operational at block 245, service center 120 then checks the computer network 130 redundant communications interfaces 160 and 125, respectively, at block 250. This check is done so as to eliminate communication interfaces 125 and 160 as possible causes for the failed DA handshake of block 210. If it is determined that both the primary communications interface 115 and redundant communication interfaces 160 and 125 are non-operational, the service center 120 calls to the attention of an operator the status of the failed communication interfaces at block 253. The operator may then address the failed aspects of the primary communication interface 115 and the redundant communication interfaces 125 and 160, respectively. Upon an independent solution to the communications interface problem, the service center 120 processing returns to block 245 to check that the primary communication interface 115 and the redundant communication interfaces 125 and 160 are once again operational.

Figure 3:
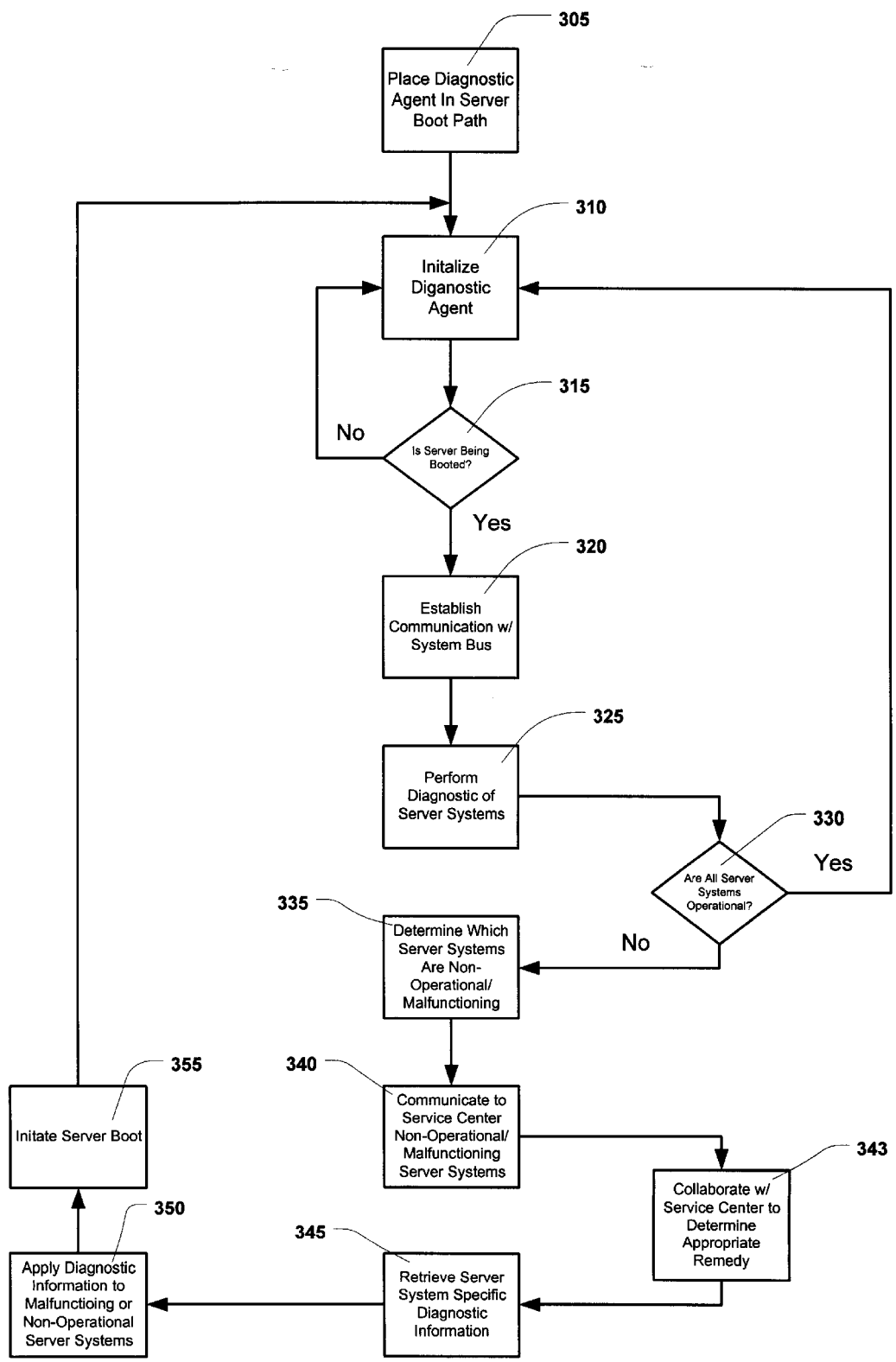
FIG. 3 is a flowchart illustrating the processing of the diagnostic agent as described in FIG. 2 in accordance with the present invention.

As described, service center 120 relies on diagnostic and remedial functions to be performed by diagnostic agent 110. FIG. 3 shows the processing undertaken by diagnostic agent 110, described above, in more detail. Diagnostic agent 110 is first placed in the boot path of computer server at block 305. As part of the boot path of computer server 105, diagnostic agent 110 has the ability to communicate with computer server 105 when computer server 105 boots or reboots. Information communicated between diagnostic agent 110 and computer server 105 includes operability sates of computer server 105 systems. Once configured for boot path orientation, diagnostic agent 110 is initialized at block 310. Diagnostic agent 110 then checks to see if the targeted computer server 105 is in a boot or reboot process at block 315. If the computer server 105 is not in boot, diagnostic agent 110 returns to block 310 where it is reinitialized. Processing continues therefrom. However, if the contrary is true, diagnostic agent 110 proceeds to initiate communications with a system bus of computer server 105 at block 320. Once the communications have been established with a system bus of computer server 105, diagnostic agent 110 then begins to perform a diagnostic of the systems of computer server 105 at block 325. The diagnostic will determine if all of the systems of computer server 105 are operational at block 330. If the systems of computer server 105 are operational, diagnostic agent 110 processing returns to block 310 where diagnostic agent 110 re-initializes. Processing continues therefrom.

However, If one or more of computer server 105 systems are malfunctioning or non-operational, diagnostic agent 110 will proceed to determine those systems which are malfunctioning or non-operational at block 335. Armed with this information, diagnostic agent 110 proceeds to block 340 where it communicates with service center 120 the states of the systems of computer server 105. Diagnostic agent 110 then collaborates with the service center 120 at block 343 to determine the most appropriate diagnostic and remedial strategy for the discovered problem. Accordingly, based on the results of the collaboration of block 343, diagnostic agent 110 retrieves server system specific diagnostic information from service center 120 at block 345. Diagnostic agent 110 then applies diagnostic and remedial information to computer server 105 systems at block 350. Therefrom, the diagnostic agent 110 initiates a reboot of computer server 105 at block 350 and proceeds to re-initialize itself at block 310.

Business Method for Remote Monitoring

Figure 4:
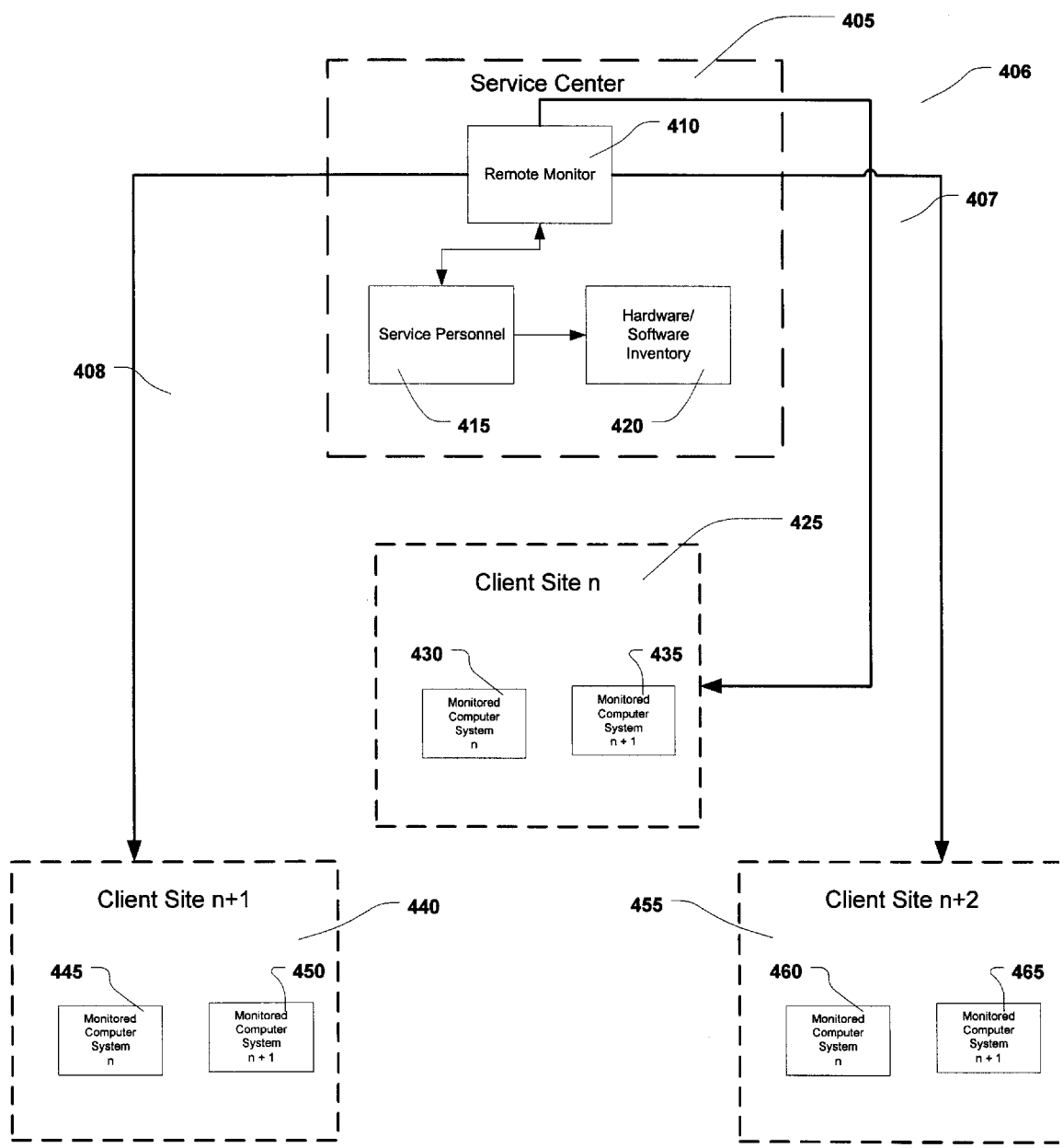
FIG. 4 is a system diagram for a contemplated business method provided by the present invention.
Figure 5:
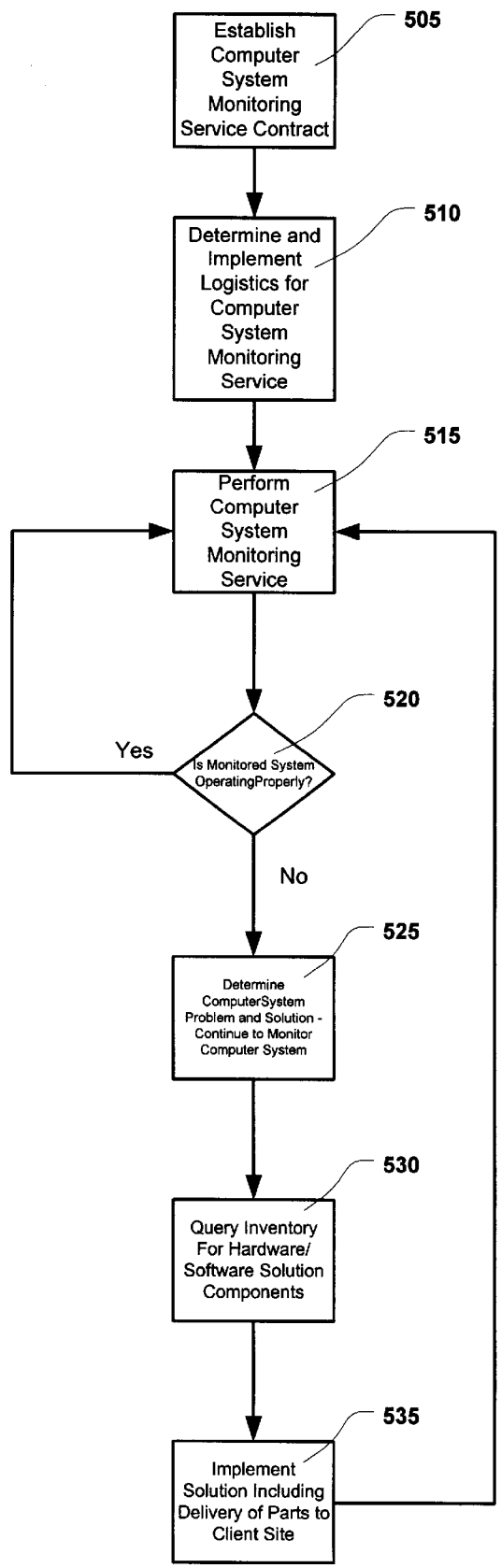
FIG. 5 is a processing flowchart for the business method of FIG. 4.

An alternative embodiment of the present invention provides a business method that allows remote monitoring including diagnostic and remedial services from a service center to a plurality of computer systems located in various client sites. FIGS. 4 and 5 describe the business model of the alternative embodiment. FIG. 4 shows service center 405 having remote monitor 410. Remote monitor 410 may be implemented as either computer software or hardware or a combination thereof. Remote monitor 410 is further coupled to service personnel 415 of service center 405, such that service personnel 415 can view or receive monitoring information from remote monitor 410.

FIG. 4 further shows, remote monitor 410 as being electronically coupled to client sites 425, 440 and 455, respectively. Remote monitor 410 collects and transfers a plurality of information and data to monitored computer systems 430, 435, 445, 450, 460, or 465 of client sites 425, 440 or 455, respectively. Client site 425 may maintain a plurality of monitored computer systems 430 and 435. Similarly, client sites 440 and 455 may maintain a plurality of monitored computer systems 445 and 450, and 460 and 465, respectively. Accordingly, remote monitor 410 can accommodate as many client sites that may require remote monitoring services. Remote monitor 410 is electronically coupled to client sites 425, 440, and 455 through communications interfaces 406, 407 and 408 respectively. Communication interfaces may include but are not limited to wireless or fixed line modems, or computer networks. In addition, service center 405 maintains hardware/software inventory 420, such that service personnel 415 can retrieve replacement software or hardware from hardware/software inventory 420 and deliver them to any of the client sites 425, 440, or 455 when any one of the monitored computer systems indicates to remote monitor 410 that a subsystem of the monitored computer systems has become non-operational or is malfunctioning. Service center personnel 415 of service center 405 may use information stored by remote monitor 410 in an effort to provide monitoring services, offered by service center 405, to client sites 425, 440 or 455. Such information may relate to fault monitoring, performance monitoring, accounting information, or system management information. The information gathered would help in assisting service personnel 415 of service center 405 in making a determination of which services to offer and provide to client sites 425, 440, or 455.

Although the depicted embodiment provides monitoring services directed to fault monitoring and system management, those skilled in the art will appreciate that the inventive concepts described herein extend to various types of monitoring, including performance monitoring, accounting monitoring, and system management monitoring for various computer systems having a plurality of computing devices running different computing operating systems and having varying hardware configurations Accordingly, FIG. 5, in context with FIG. 4, describes further the process by which the business method of the alternative embodiment is implemented. A service contract is first established between a service center and a client wishing their computer system(s) be monitored at block 505. Service center personnel 415 will then determine the logistics required to realize remote monitoring services for the targeted computer system. For example, which communication interface (i.e. fixed wire or wireless modem, LAN, WAN, intranet, or the Internet) to employ between the service center 405 and the targeted computer system 430 of client site 425. Once the logistics have been finalized and the components and devices for remote monitoring have been implemented, the service center 405 begins to perform remote monitoring of the targeted computer system at block 515.

Among the plurality of monitoring services offered, service center personnel 415 of service center 405 can provide fault monitoring. This is achieved through the use of remote monitor 410. Remote monitor 410 is used to continually check the status of the targeted computer system at block 520. If the monitored computer system 430 is fully operational, the service center 405 continues monitoring functions and processing is returned to block 515. However, if the contrary is true, service center 405, using information obtained from remote monitor 410, determines what caused the computer system failure and provides a solution for the discovered failure at block 525. It is important to note that even though the monitored computer system is malfunctioning, remote monitor 410 continues to collect diagnostic and remedial information of the monitored computer system, as shown by block 525.

The solution developed at block 525 may include the use of diagnostic and remedial functionality and information maintained by remote monitor 410. This information is used to remotely diagnose and remotely apply remedial functions to the monitored computer system 430. Also, as replacement parts may be part of the solution developed, service personnel 415 of service center 405 search hardware/software inventory 420 for replacement parts at block 530. Service personnel 415 then proceed to implement the derived solution, including delivery of replacement parts to client site at block 535. The present problem having been ameliorated, the service center returns to block 515 to continue remote monitoring of the targeted computer system.

Conclusion

In sum, the present invention provides a system and process for monitoring and, where necessary, servicing remotely located computers, preferably using an Internet-based service center and diagnostic boards directly coupled to the computers being monitored. It is understood, however, that the invention is susceptible to various modifications and alternative constructions. There is no intention to limit the invention to the specific constructions described herein. On the contrary, the invention is intended to cover all modifications, alternative constructions, and equivalents falling within the scope and spirit of the invention.

It should also be noted that the present invention may be implemented in a variety of computer systems. The various techniques described herein may be implemented in hardware or software, or a combination of both. Preferably, the techniques are implemented in computer programs executing on programmable computers that each include a processor, a storage medium readable by the processor (including volatile and non-volatile memory and/or storage elements), at least one input device, and at least one output device. Program code is applied to data entered using the input device to perform the functions described above and to generate output information. The output information is applied to one or more output devices. Each program is preferably implemented in a high level procedural or object oriented programming language to communicate with a computer system. However, the programs can be implemented in assembly or machine language, if desired. In any case, the language may be a compiled or interpreted language. Each such computer program is preferably stored on a storage medium or device (e.g., ROM or magnetic disk) that is readable by a general or special purpose programmable computer for configuring and operating the computer when the storage medium or device is read by the computer to perform the procedures described above. The system may also be considered to be implemented as a computer-readable storage medium, configured with a computer program, where the storage medium so configured causes a computer to operate in a specific and predefined manner.

Although exemplary embodiments of the invention has been described in detail above, those skilled in the art will readily appreciate that many additional modifications are possible in the exemplary embodiments without materially departing from the novel teachings and advantages of the invention. Accordingly, these and all such modifications are intended to be included within the scope of this invention as defined in the following claims.

What is claimed is:

1. A system for remotely monitoring a computer system, comprising:
   a diagnostic agent resident in said computer system performing diagnostic and remedial functions on said computer system;
   a communications interface electronically coupled to the diagnostic agent;
   and a service center with a database of diagnostic and remedial information about computer systems running various operating environments on different hardware configurations, electronically coupled to the communications interface, for electronically communicating with the diagnostic agent to perform functions on and control said computer system.

2. The remote monitoring system recited in claim 1, wherein said diagnostic and remedial functions comprise:
   interrogating said computer system to obtain computer system specific information;
   storing said computer system specific information, said computer system specific information comprising at least one of fault monitor information, accounting information, performance information, and system management information;
   processing said system computer specific information for errors; and
   providing information specific to said computer system to correct said errors.

3. The remote monitoring system recited in claim 1, wherein said computer system comprises a computer server as part of a computer network, said computer network being electronically coupled to said service center such that if and when said communication interface fails, said service center is still able to communicate with said diagnostic agent through said computer network.

4. The remote monitoring system recited in claim 2, wherein said computer system is a World Wide Web computer server.

5. The remote monitoring system recited in claim 1, wherein said diagnostic agent is placed in the boot path of said computer system, said diagnostic agent communicating with the computer system through a communications bus interrogating said computer system for operations state and upon the detection of a non-operating state, determining a diagnostic and remedial course of action, communicating the operations state of said computer system with said service center and retrieving specific diagnostic and remedial tools from said service center to apply to said computer system.

6. The remote monitoring system recited in claim 4, wherein said diagnostic agent and said service center have the ability to reboot said computer system.

7. The remote monitoring system recited in claim 1, wherein said diagnostic agent comprises an add-on peripheral computer board placed in said computer system.

8. The remote monitoring system recited in claim 1, wherein said communication interface comprises at least one of a wireless or fixed wire or wireless modem, local area network, wide area network, intranet, and the Internet.

9. The remote monitoring system recited in claim 1, wherein said service center comprises a communication means to indicate states of the monitored computer system to a human operator.

10. The remote monitoring-system recited in claim 1, wherein said diagnostic agent and said service center are adaptable and updateable to maintain new and different diagnostic and remedial information.

11. A system for remote monitoring of computer systems, comprising:
    a service center having diagnostic and remedial capabilities; and
    a diagnostic agent residing in a remote computer system electronically coupled to said service center, wherein said diagnostic agent has diagnostic and remedial capabilities including the ability to interrogate said computer system to determine its operability, the ability to communicate to said service center the state of said computer system, the ability to retrieve diagnostic and remedial information from said service center, and the ability to process and communicate system specific diagnostic information to the computer system.

12. The remote monitor system recited in claim 11, wherein said diagnostic agent polls said computer system for operability information, stores and communicates operability information to said service center such that the service center can reconstruct the operability states of said computer system in the event of complete computer system failure.

13. A method for remotely monitoring a computer system comprising the acts of:
    (a) gathering system status information local to a computer system with a diagnostic agent, the diagnostic agent being resident on said computer system;
    (b) processing the system status information by said diagnostic agent to determine the diagnostic strategy to be implemented on said computer system;
    (c) communicating said system status information and interacting with a service center by said diagnostic agent, said service center transferring system specific diagnostic information to the computer system through said diagnostic agent; and
    (d) processing and communicating system specific diagnostic information to the computer system by said diagnostic agent.

14. A method for remotely monitoring a computer system comprising the acts of:
    (a) placing a diagnostic agent in a targeted computer system, said diagnostic agent communicating with said computer system to obtain information about the computer system's operability;
    (b) electronically coupling said diagnostic agent to a service center remotely located to said computer system, wherein said diagnostic agent and said service center communicate to determine the solution for a computer system operability problem;
    (c) providing diagnostic and remedial information to said diagnostic agent by said service center directed towards monitoring and overcoming computer system operability problems; and
    (d) storing information about computer system operability states used to reconstruct computer system operability.

15. A business process comprising:
(a) providing diagnostic boards to be inserted into boot paths of a plurality of remotely located server computers; and
(b) providing a service center that is accessible to said diagnostic boards; wherein each diagnostic board is operative to detect a failure of the server with which it is associated and to initiate communications with said service center, and wherein the service center, which maintains a database of diagnostic and remedial information about computer systems running various operating environments on different hardware configurations, is operative to provide diagnostic software to the diagnostic boards upon request, whereby said diagnostic boards are able to diagnose and remedy detected failures with the diagnostic software and to initiate further remedial action via said service center.

* * * * *